Feb. 8, 1944.  L. M. TAYLOR  2,341,488
FABRICATED INTERNAL COMBUSTION ENGINE
Filed April 8, 1941  2 Sheets-Sheet 1
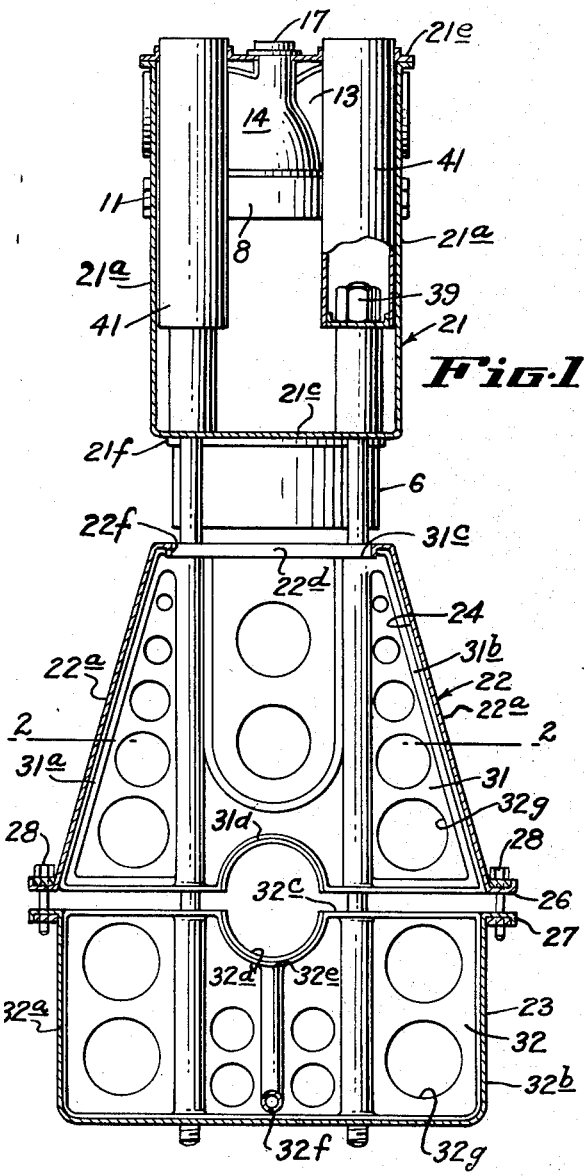
INVENTOR.
LLOYD M. TAYLOR
BY
Arlington E. White
ATTORNEY.

Feb. 8, 1944. L. M. TAYLOR 2,341,488
FABRICATED INTERNAL COMBUSTION ENGINE
Filed April 8, 1941 2 Sheets-Sheet 2
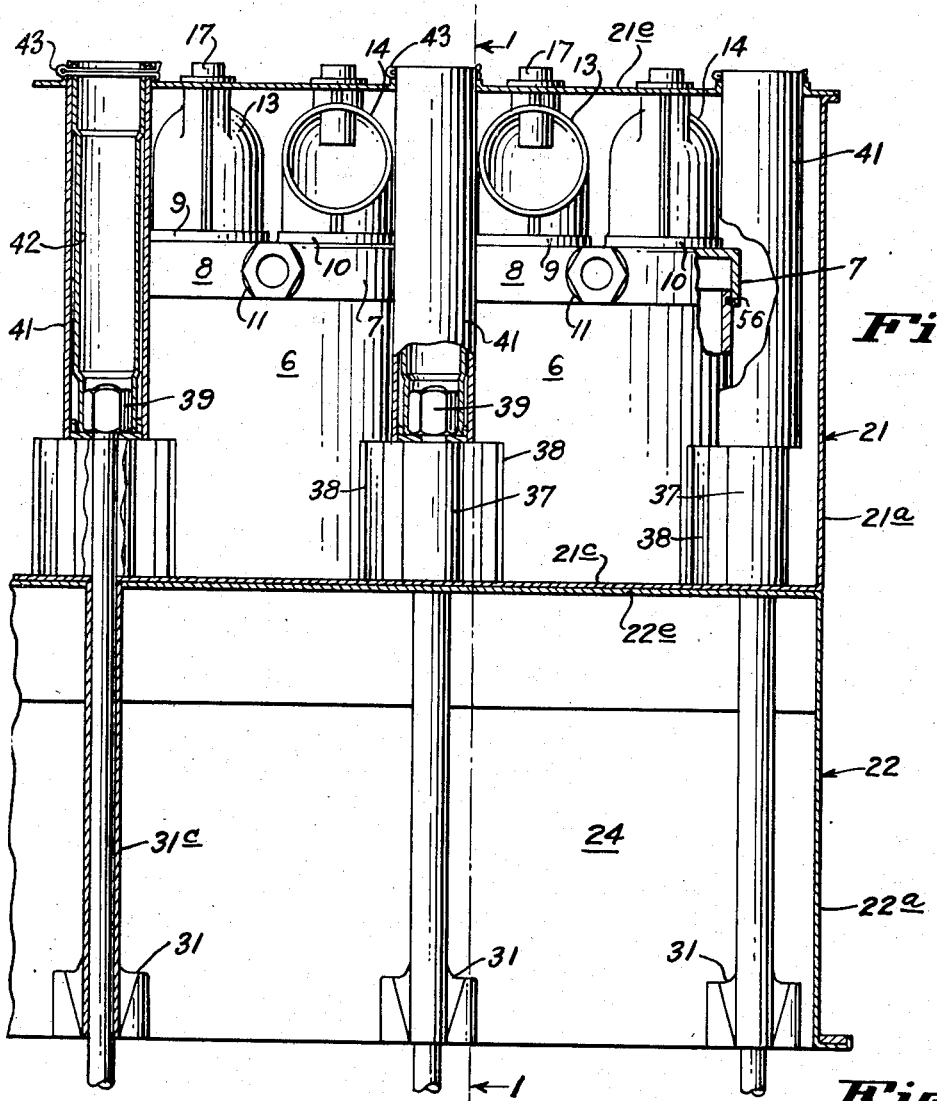
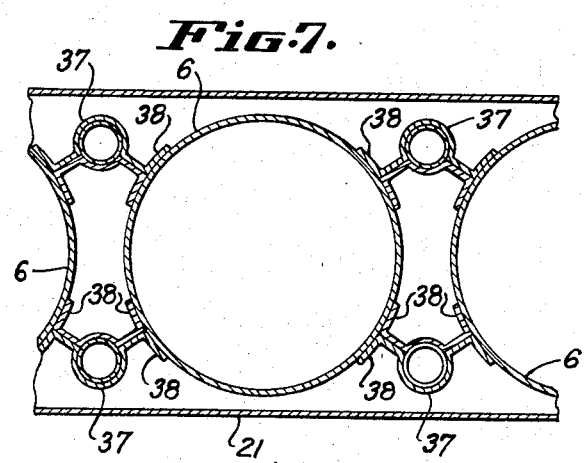
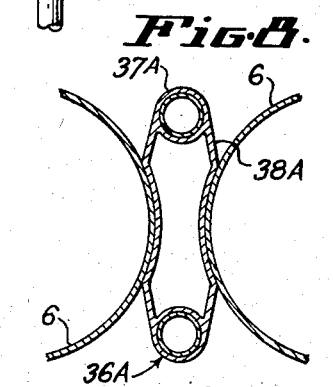
INVENTOR.
LLOYD M. TAYLOR
BY
ATTORNEY Patented Feb. 8, 1944

2,341,488

UNITED STATES PATENT OFFICE 2,341,488

FABRICATED INTERNAL COMBUSTION ENGINE

Lloyd M. Taylor, San Leandro, Calif., assignor, by direct and mesne assignments, to Taylor Engines, Inc., Oakland, Calif., a corporation of Nevada Application April 8, 1941, Serial No. 387,410

3 Claims. (Cl. 123—195)

The invention, in general, relates to engine construction and more particularly relates to the production of a welded, liquid-cooled, lightweight engine especially useful for aircraft and embodying relatively thin metal parts of uniform thickness.

It is probably well known that the efficiency of performance of internal combustion engines depends in the main upon effective and rapid dissipation of heat. The absence of proper means for dissipating heat, together with the utilization of metal parts of uneven thickness, gives rise to internal stresses, the creation of hot spots that are almost impossible to control, as well as the distortion of parts. Another primary factor effecting optimum performance of such engines is, of course, the weight of the engine in relationship to developed horse-power. In recent years, due to the improvement in steel alloy stampings, considerable improvement has been effected in the efficient performance of internal combustion engines made therefrom since such alloy stampings afford appreciable reduction in weight. However, practically all engines heretofore constructed from such stampings have required the utilization of a large number of bolts for connecting the assembled parts together, with the result that appreciable areas of uneven thickness of material is required throughout the engine to off-set the pressures exerted by the bolts and this, in turn, involves undue internal stresses and distortion. The improved fabricated internal combustion engine of my present invention, in which alloy steel stampings are employed, has a minimum of bolts in view of the utilization of hydrogen-copper brazing means for permanently welding the parts together, and also in view of the large welding areas provided. Thus, material of even or uniform thickness is employed throughout and effective heat dissipation is had without the creation of hot spots or distortion. Moreover, a relatively strong and rigid engine is produced with a minimum of weight. My improved method of fabricating engines including as it does the provision of appreciably large areas for effective welding of parts permanently in a hydrogen-copper brazing furnace, affords appreciably stronger joints throughout the engine which have far greater resistance to the relatively high stresses in shear which are set up in an internal combustion engine by the explosions of the combustible charges.

One of the important objects of the present invention is to provide an improved fabricated engine especially suitable for aircraft which has a minimum number of bolts and has no appreciable areas of material of uneven thickness.

Another object of the invention is to provide an improved engine of the aforementioned character which is rigid, durable and characterized by the ease of dismantling the cylinders for servicing valves and other parts.

A still further object of the invention is to provide an improved aircraft engine fabricated from sheet metal stampings of uniform thickness and characterized by the provision of means therein for taking care of internal stresses set up in the operation of the engine as well as means for effectively and rapidly dissipating heat.

Another object of my present invention is to provide a method of fabricating internal combustion engines from steel stampings which affords much greater welding areas for effective permanent welding of parts in a hydrogen-copper brazing furnace.

A still further object of my invention is to provide a method of fabricating engines of the indicated nature which lends itself admirably to mass production of an increased quantity of engines in a minimum of time and with a minimum of expense.

Other objects of the invention, together with some of the advantageous features thereof, will appear from the following description of a preferred embodiment of the invention which is illustrated in the accompanying drawings. It is to be understood that while I have depicted a preferred embodiment of the invention in the drawings, I am not to be limited to the precise embodiment shown, as my invention, as defined in the appended claims, can be embodied in a plurality and variety of forms.

Referring to the drawings:

Figure 1 is a view of the preferred embodiment of the invention taken on the line 1—1 of Figure 6; this view also shows the lower portion of the engine.

Figure 2 is a view taken on the line 2—2 of Figure 1.

Figure 3 is a top plan view of one element of the preferred embodiment of the invention.

Figure 4 is a sectional elevational view of one of the cylinder heads, inclusive of valve guide, illustrating the jacketing of the valve guide.

Figure 5 is a partial perspective view of a cylinder sleeve of the engine with its supporting brackets.

Figure 6 is a fragmentary sectional elevational view of a pair of the cylinders of a preferred embodiment of the invention, parts thereof being broken away to show the manner of connecting cylinder heads to sleeves and of bolting engine parts together.

Figure 7 is a transverse sectional view, partly broken away, illustrating the supporting brackets for cylinders as embodied in the improved engine.

Figure 8 is a broken, transverse sectional view of a modified cylinder supporting bracket.

In its preferred form, the fabricated internal combustion engine of the present invention preferably comprises a plurality of separately mounted cylinders of drawn metal tubing, said cylinders being adapted to be arranged in line in parallel relationship, a cooling medium jacket surrounding the upper portions of said cylinders; said jacket including a bottom having a plurality of spaced openings therein for passing said cylinders, a plurality of circumferentially spaced cylinder supporting brackets united directly to the exterior surface of each of said cylinders for rigidly supporting the same; said brackets being mounted within said jacket and seating on the bottom thereof, a two-section crankcase, means for detachably fastening the sections of said crankcase together, a plurality of main bearing webs mounted in said crankcase and directly united thereto; said main bearing webs consisting of sets of two sections each and being arranged in sets on opposite sides of each cylinder, and means passing through said cylinder supporting brackets and said main bearing webs for detachably connecting said jacket to said crankcase as well as detachably connecting main bearing web sections together in sets.

As particularly illustrated in Figures 1 and 6 of the drawings, my improved fabricated internal combustion engine comprises a plurality of cylinder sleeves 6 of drawn seamless tubing preferably formed from a relatively high tensile strength steel alloy, such as an alloy containing chromium and molybdenum. Each of the cylinders 6 is capped with a head 7 which can either be cast or forged, and the heads are directly united to the tops of the cylinder sleeves by welding as hereinafter described. Each of the heads 7 is formed with an open bottom, the opening being defined by an annular flange 8 and being of slightly smaller diameter than the outer diameter of the cylinders so that a relatively tight press fit may be had between the cylinder heads and the cylinder sleeves. The heads 7 are so formed as to provide thereon a pair of top apertured bosses 9 and 10 as well as a pair of side apertured bosses 11 and 12 on the flanges 8 thereof, the latter apertured bosses being internally threaded for removably receiving suitable spark plugs, not shown.

In accordance with the present invention, each of the cylinder heads 7 supports a pair of opposed conduits, in the form of elbows 13 and 14, which press inside of bosses 9 and 10 of the heads and which communicate with the interior of the cylinder sleeves 6 through apertures in the bosses and the openings in the heads. Elbows 13 and 14 of each of the heads 7 are united to and placed in communication with suitable intake and exhaust manifolds, not shown, for conducting charges and exhaust gases, respectively, to and from the cylinders. Each of the elbows 13 and 14 is fabricated from sheet metal stampings and may be formed from complementary half-sections united together preferably by means of welding, and the elbows are united directly also by welding to the bosses 9 and 10 of the cylinder heads 7; the elbows each having a valve seat 16, preferably faced with a hard facing, non-corrosive metal, united thereto. Each elbow also is formed with a valve guide thereon, such valve guides 17 having valve sleeves 18 therein through which valve stems, not shown, reciprocate. As shown, the valve sleeves 18 are flanged top and bottom for supporting the same between the top or cover plate of a cooling medium jacket of the engine and an auxiliary cooling medium jacket surrounding the sleeves as hereinafter described. It is to be understood that the foregoing elements of the engine, inclusive of cylinder sleeves 6, heads 7 and elbows 13 and 14 thereon, are assembled and aligned upon a suitable jig, and the parts temporarily united together by spot welding preliminary to treatment thereof for introduction of the assembled parts into a hydrogen-copper brazing furnace for permanently uniting these non-moving parts of the engine yet permitting ready accessibility to and removal of the cylinders for the servicing of valves, etc., etc.

My improved fabricated internal combustion engine includes a three-section casing comprising a cooling medium jacket 21 surrounding the upper portions of the cylinder sleeves 6 as well as the cylinder heads 7 and elbows 13 and 14, together with a two-section crankcase including an upper section 22 and a lower section 23. The cooling medium jacket 21 consists of a one piece stamping fabricated as a unit to form a box-like container, the walls 21a of which are suitably apertured for passing spark plugs as well as intake and exhaust manifolds, all not shown, and the bottom 21c of which is provided with a plurality of spaced openings not shown for passing the cylinder sleeves 6. In forming the openings in the bottom of the cooling medium jacket 21, the material around the openings is pressed outwardly to provide annular depending flanges 21f surrounding the cylinder sleeves 6 thus providing an increased welding area or surface for uniting the cylinder sleeves 6 to such flanges 21f. The top or cover plate 21e of the cooling medium jacket 21 is formed with a plurality of suitable openings therein for passing the valve guides as well as additional openings for passing bolt protecting sleeves, as hereinafter described. As particularly illustrated in Figures 1 and 6 of the drawings, the upper section 22 of the crankcase of the engine comprises a drawn or fabricated integral casing, the walls 22a of which preferably are slanted, as shown, to conform to the slanting sides of the upper sections of the main bearing webs hereinafter explained. A plurality of spaced openings 22d are formed in the top or cover plate 22e of the upper section of the crankcase for passing the cylinder sleeves 6, the material being pressed outwardly adjacent the openings to provide annular flanges 22f surrounding each cylinder sleeve and serving to constrain the same against radial movement, the flanges providing a stiffening surface to support a suitable gasket between the sleeves and the flanges. No bottom is provided for the upper section 22 of the crankcase. The lower section 23 of the crankcase also consists of a box-like receptacle fabricated as an integral casing and without any top or cover plate so that with the two sections of the crankcase in abutment, as depicted in Figure 1 of the drawings, a complete multiple box structure defining a lubricating compartment 24 is provided. Both the upper and lower sections of the crankcase are formed with a laterally extending apertured flange 26 and 27, respectively, through which screw-bolts 28 may be passed for detachably connecting the two sections together.

In accordance with my invention in the present fabricated internal combustion engine, I provide a plurality of sets of main bearing webs which are arranged in pairs on opposite sides of each of the cylinders 6, and each set of which includes an upper bearing web section 31 and a lower bearing web section 32. As shown in Figure 1 of the drawings, the upper bearing web sections 31 are formed preferably with slanting sides 31a and 31b, and these web sections transversely span the upper sections 22 of the crankcase with the sides 31a and 31b thereof directly united by means of welding to the inner surfaces of such crankcase section 22. Each web section 31 is formed with spaced, vertical channels or passages 31c therein for passing screw-bolts, as hereinafter explained, and also carries a half-bearing 31d on the bottom thereof. The lower bearing web sections 32 are preferably formed to a rectangular shape to conform to the lower section 23 of the crankcase and transversely span the same with the sides 32a and 32b of the web sections directly united by means of welding to the inner surfaces of the lower crankcase section. The crankcase, hence, assumes a cellular structure with the lower web sections 32 as the partitions of the cells. Lower bearing web sections 32 are similarly formed with spaced, vertical channels or passages 32c in alignment with the channels 31c of the upper bearing web sections of the corresponding set of two-section bearing webs. Moreover, each of the lower bearing web sections 32 carries a complementary half-bearing 32d which, together with the half-bearing 31d of the upper bearing web section 31, constitutes a complete main bearing. The lower web sections 32 all are formed so as to provide a small duct 32e terminating in ports 32f opening into the lubricating oil compartment 24 of the crankcase, the ducts 32e serving as means for conducting a lubricant to the main bearings. As clearly depicted in Figure 1 of the drawings, both the upper and lower bearing web sections 31 and 32 of each set are provided with a plurality of openings 32g therein for permitting free flow of lubricating fluid within the crankcase.

As particularly illustrated in Figures 1, 5 and 7 of the drawings, the improved fabricated internal combustion engine of my present invention includes a plurality of sets of cylinder supporting brackets which are designated generally by the reference numeral 36, and I preferably provide four of such brackets for supporting each cylinder with the brackets circumferentially spaced about the cylinder sleeves 6 as shown in Figure 7. The cylinder supporting brackets 36 may be fabricated from steel stampings, or cast or forged, as desired, and each preferably comprises a hollow, split cylindrical body portion 37 carrying generally T-shaped extensions thereon forming opposed laterally extending flanges 38 of relatively large width and slightly arcuate in shape to conform to the contour of the exterior surfaces of the cylinder sleeves 6; the flanges 38 being substantially of the same length as the body portion 37 of the brackets, thus providing an appreciable welding area for effectively uniting the brackets to the cylinder sleeves. It will be clear by reference to the drawings that the brackets 36 which are disposed between two adjacent cylinder sleeves 6 carry two opposed T-shaped extensions so that the flanges thereof support cylinders in juxtaposition, while the brackets 36 at the ends of the engine carry only one inwardly faced T-shaped extension instead of two opposed extensions. As shown in Figure 1 of the drawings, the brackets 36 all seat upon the bottom of the cooling medium jacket 21 and within the same. In addition to performing the function of supporting the cylinders of the engine, the brackets 36 provide passages through the body portions 37 thereof for passing screw-bolts 39 which are relatively long and extend not only through the cylindrical body portions 37 of the brackets but also through channels 31c and 32c of the upper and lower bearing web sections 31 and 32, respectively, as well as through the bottom of the lower crankcase section 23 in which holes are provided for such purpose. Thus, there is provided means for detachably fastening the cooling medium jacket 21 to the upper section 22 of the crankcase as well as means for readily retracting the cylinders when the bolts 39 are loosened to permit lifting of the cooling medium jacket. With such an arrangement and connections, the cylinders and valves are made readily accessible for repair or replacement. A modified form of cylinder supporting bracket is illustrated in Figure 8 of the drawings and is indicated generally by the reference numeral 36A. This modified bracket functions in the same manner as bracket 36 and differs therefrom solely in the formation of the flanges. In other words, bracket 36A includes a hollow, split-cylindrical body portion 37A carrying an extension which in effect constitutes a complete web flange 38A extending between two aligned brackets 36A, the web flange 38A being arcuately shaped to conform to the contour of the cylinder sleeves 6 and providing an appreciably increased welding arc for uniting the brackets to the sleeves.

In order to avoid undue expansion from overheated bolts and prevent freezing thereof, I provide means for enabling the use of shorter bolts 39 which preferably include relatively long protective sleeves 41 enveloping the upper ends of the bolts and seated conveniently upon the tops of the body portions 37 of the cylinder supporting brackets 36; the sleeves 41 extending to the top or cover plate 21e of the cooling medium jacket 21. In addition, I provide inner sleeves 42 in the protecting sleeves 41, such inner sleeves each having their lower ends swaged to grip the nuts of the screw-bolts 39 and thus constrain the same against rotational movement. The upper extremities of the sleeves 41 and 42 are provided with suitable openings for passing cotter pins 43 which serve to retain the inner sleeves 42 in position.

Means are provided for reducing the likelihood of valve trouble from overheating to a minimum, such means affording the rapid dissipation of heat from around the valve guides and valve sleeves. To this end, I provide in each of the elbows 13 and 14 relatively small auxiliary cooling medium jackets, which are designated generally by the reference numeral 46; each auxiliary cooling medium jacket consisting of a generally U-shaped wall 47 and an apertured bottom 48 for permitting passage of the valve sleeves 18. The wall of each of the auxiliary cooling medium jackets 46 is directly united by means of welding to the inner surfaces of the elbows 13 and 14. In addition, I provide each of the elbows 13 and 14 with a series of holes 49 to permit flow of a liquid cooling medium between the cooling medium jacket 21 and the auxiliary cooling medium jackets 46 within the elbows.

The present embodiment of my invention also includes heat insulation means to protect the cam mechanism of the engine, such means preferably comprising air channels or spaces 51 all along the top of the engine between the top or cover plate 21e of the cooling medium jacket 21 and a base 52 upon which the cam mechanism, not shown, is mounted. See, in this connection, Figure 4 of the drawings wherein is depicted spacer walls 53 separating the top of the cooling medium jacket from the supporting base 52 for the cam mechanism.

It is to especially observed that my improved method of fabricating internal combustion engines, utilizing hydrogen-copper brazing for permanently uniting non-moving parts thereof, embodies two important and novel features affording the production of rigid, durable engines of great strength and having an increased resistance to shear loads which are created by the explosions of the combustible charges. One of these important features comprises placing all joints between non-moving parts under relatively high tension during assembly in order that the most effective permanent uniting by hydrogen-copper brazing means may be had. This feature of placing the joints under high tension preliminary to permanent uniting in the hydrogen-copper brazing furnace will afford extremely strong joints of considerably increased strength over the strength of the parent metal and not limited in any sense to the strength of the bonding metal, per se, which ordinarily is the case of welded joints. For example, it will be noted that all cylinder sleeves 6 of my improved fabricated engine are press-fitted to the cylinder heads 7; that all of the sleeves 6 likewise are press-fitted to the flanges 21f of the bottom of the cooling medium jacket 21; and that the cylinder sleeves are under tension at the joints between such sleeves and the flanges 38 of the cylinder supporting brackets 36. The other important characteristic of my improved method of fabricating internal combustion engines consists in providing appreciably increased welding areas at all joints between non-moving parts. For example, the flanges 21f of the bottom of the cooling medium jacket 21 are made relatively high to furnish appreciable annular welding areas around each cylinder sleeve 6 which is, as stated above, press-fitted thereto; the bosses 9 and 10 of the cylinder heads 7 likewise are made high to give additional increased welding areas; and the flanges 38 of the cylinder supporting brackets 36 are constructed relatively long and wide so that, with the provision of a plurality of supporting brackets per cylinder, considerably increased welding surface per cylinder is provided. It is important to note that the joints of engines heretofore constructed from steel stampings, or otherwise, are capable of withstanding stresses in shear to the approximate value of 50,000 pounds per square inch whereas engines fabricated in accordance with my improved method affording appreciable welding areas throughout and having all joints under tension when subjected to treatment in the hydrogen-copper brazing furnace, provides joints throughout the engine that are capable of resisting nearly four times the shear load of other engines, or approximately 200,000 pounds per square inch. Thus, my improved engine is especially suitable for heavy duty work and is adaptable admirably as the main power unit for large air craft.

In assembling the aforesaid various non-moving parts of the engine and preparing the same for permanent uniting of the parts, copper rings are applied at joints wherever possible such as copper rings 56 between the upper portion of the cylinder sleeves and the cylinder heads as indicated in Figures 4 and 6 of the drawings, or copper paste is applied to the meeting surfaces of adjacent parts wherever deemed advisable although, if desired, all areas to be welded may be sprayed with a suitable welding material using a metal spray gun. The parts of the assembly are conveniently spot welded together on an aligning and assembling jig, and after the welding material has been applied the temporarily united assembly is placed in the hydrogen-copper brazing furnace where it is allowed to remain for a predetermined time interval until all parts are permanently united together. Thereafter the engine is heat treated in the conventional manner for hardening the cylinders for wear and increased strength. The pistons, connecting rods, cam shafts, crankshaft, valves, valve stems and valve actuating mechanism, with all attendant operating parts, may then be assembled and fitted, with the usual minor machine work for providing the necessary tolerances.

It is to be understood that the appended claims are to be accorded a range of equivalents commensurate in scope with the advance made over the prior art.

I claim:

1. In a fabricated internal combustion engine, a cylinder, a cooling medium jacket surrounding said cylinder; said jacket including a bottom having an opening therein for passing the skirt of said cylinder, and a plurality of circumferentially spaced cylinder supporting brackets united directly to the exterior surface of said cylinder and seated on said bottom of said jacket.

2. In a fabricated internal combustion engine, a cylinder, a cooling medium jacket surrounding said cylinder; said jacket including a bottom having an opening therein for passing the skirt of said cylinder, a plurality of circumferentially spaced cylinder supporting brackets united directly to the exterior surface of said cylinder and seated on said bottom of said jacket, a crankcase, and a plurality of bolts extending through said brackets and through said bottom of said jacket and through said crankcase for detachably connecting said crankcase to said jacket.

3. In a fabricated internal combustion engine, a cylinder, a cooling medium jacket surrounding said cylinder; said jacket including a bottom having an opening therein for passing the skirt of said cylinder, a plurality of circumferentially spaced cylinder supporting brackets united directly to the exterior surface of said cylinder and seated on said bottom of said jacket, a two-section crankcase including an upper section and a lower section, a plurality of sets of main bearing webs arranged on opposite sides of said cylinder and each consisting of an upper main bearing web section and a lower main bearing web section; said upper main bearing web sections transversely spanning said upper section of said crankcase and said lower main bearing web sections transversely spanning said lower section of said crankcase, and a plurality of bolts extending through said brackets and through said bottom of said jacket and through said upper and lower main bearing web sections and through said crankcase for detachably connecting said web sections together as well as detachably connecting said cooling medium jacket to said crankcase.

LLOYD M. TAYLOR.